United States Patent
Denny

(10) Patent No.: US 7,627,977 B2
(45) Date of Patent: Dec. 8, 2009

(54) ANIMATED WILDFOWL DECOY

(76) Inventor: Arthur Denny, 60 Watercrest Dr., Franklin, NY (US) 13775

( * ) Notice: Subject to any disclaimer, the term of this patent is extended or adjusted under 35 U.S.C. 154(b) by 85 days.

(21) Appl. No.: 11/862,576

(22) Filed: Sep. 27, 2007

(65) Prior Publication Data

US 2008/0078113 A1    Apr. 3, 2008

Related U.S. Application Data

(60) Provisional application No. 60/827,454, filed on Sep. 29, 2006.

(51) Int. Cl.
*A01M 31/06* (2006.01)
(52) U.S. Cl. .................................................. 43/2
(58) Field of Classification Search ............... 43/2, 43/3
See application file for complete search history.

(56) References Cited

U.S. PATENT DOCUMENTS

| | | | | |
|---|---|---|---|---|
| 2,480,390 A * | 8/1949 | Thompson | | 43/3 |
| 2,849,823 A * | 9/1958 | Miller | | 43/3 |
| 2,953,869 A * | 9/1960 | Collischan | | 43/2 |
| 3,350,808 A * | 11/1967 | Mitchell | | 43/3 |
| 3,689,927 A * | 9/1972 | Boston et al. | | 43/3 |
| 3,916,553 A * | 11/1975 | Lynch et al. | | 43/3 |
| 4,590,699 A * | 5/1986 | Nicks | | 43/2 |
| 5,036,614 A * | 8/1991 | Jackson | | 43/3 |
| 5,233,780 A * | 8/1993 | Overholt | | 43/2 |
| 5,274,942 A * | 1/1994 | Lanius | | 43/2 |
| 5,289,654 A * | 3/1994 | Denny et al. | | 43/2 |
| 5,459,958 A * | 10/1995 | Reinke | | 43/2 |
| 6,487,810 B1 * | 12/2002 | Loughman | | 43/2 |
| 6,684,552 B1 * | 2/2004 | Anders, III | | 43/2 |
| 6,708,440 B2 * | 3/2004 | Summers et al. | | 43/2 |
| 6,775,943 B2 * | 8/2004 | Loughman | | 43/2 |
| 6,901,693 B1 * | 6/2005 | Crowe | | 43/2 |
| 7,082,710 B1 * | 8/2006 | Jorgenson | | 43/2 |
| 7,231,737 B2 * | 6/2007 | Bradford | | 43/2 |
| 7,272,905 B1 * | 9/2007 | Horton | | 43/2 |
| 7,287,352 B1 * | 10/2007 | Kirby | | 43/2 |
| 7,562,487 B2 * | 7/2009 | Barr | | 43/2 |
| 2002/0162268 A1 * | 11/2002 | Fulcher | | 43/3 |
| 2003/0106253 A1 * | 6/2003 | Loughman | | 43/2 |
| 2004/0031185 A1 * | 2/2004 | Summers et al. | | 43/2 |
| 2004/0194365 A1 * | 10/2004 | Summers et al. | | 43/43.2 |
| 2004/0250461 A1 * | 12/2004 | Dryer | | 43/2 |
| 2005/0081422 A1 * | 4/2005 | Bradford | | 43/2 |
| 2005/0204604 A1 * | 9/2005 | Noles et al. | | 43/2 |
| 2007/0151139 A1 * | 7/2007 | O'Dell | | 43/2 |

(Continued)

FOREIGN PATENT DOCUMENTS

EP    1179296 A2 *    2/2002

(Continued)

*Primary Examiner*—Darren W Ark
(74) *Attorney, Agent, or Firm*—Brown & Michaels, PC

(57) ABSTRACT

An animated wildfowl decoy in the shape of a turkey having two internal servo motors to provide a reciprocal vertical motion to the head and a fanning motion to the tail feathers. The decoy has an internal power supply and a radio frequency receiver to respond to inputs from a radio frequency transmitter. A further embodiment of the animated wildfowl decoy consists of a self contained, partially encapsulated turkey tail feather assembly adaptable for use with a variety of wildfowl decoys.

5 Claims, 4 Drawing Sheets

U.S. PATENT DOCUMENTS

2008/0216381 A1 * 9/2008 Wyant .......................... 43/2
2008/0295381 A1 * 12/2008 Barr ............................ 43/2

FOREIGN PATENT DOCUMENTS

| | | | |
|---|---|---|---|
| EP | 1279333 A2 * | 1/2003 | |
| GB | 2295953 A * | 6/1996 | |
| GB | 2412560 A | 10/2005 | |

* cited by examiner

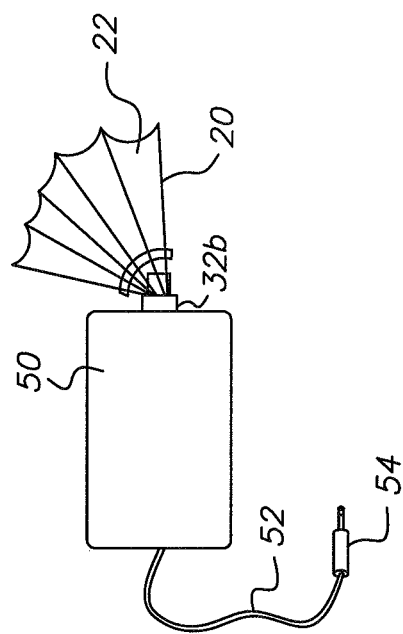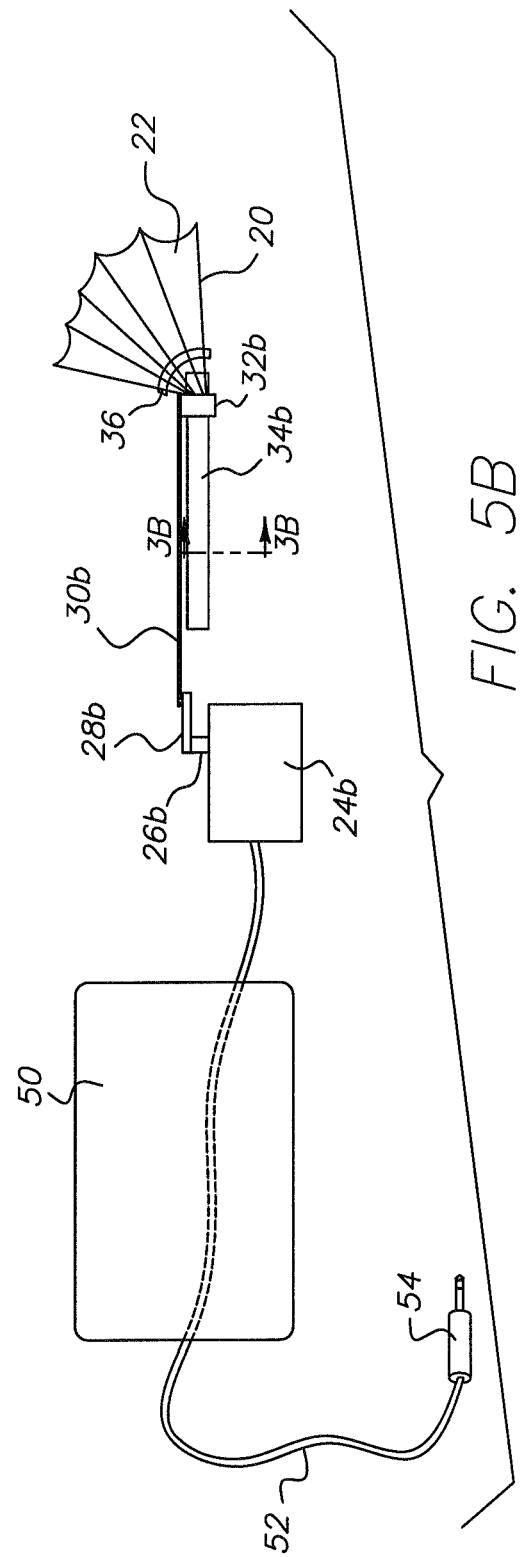

ANIMATED WILDFOWL DECOY

This application claims one or more inventions which were disclosed in Provisional Application No. 60/827,454, filed Sep. 29, 2006, entitled "Animated Wildfowl Decoy". The benefit under 35 USC § 119(e) of the United States provisional application is hereby claimed, and the aforementioned application is hereby incorporated herein by reference.

FIELD OF THE INVENTION

The invention pertains to the field of wildfowl decoys used for hunting or game control. More particularly, the invention pertains to an electronically remotely controlled, multifunctional wildfowl decoy.

BACKGROUND OF THE INVENTION

The use of decoys to attract animals is well known to hunters of various types of animal species. With respect to wildfowl, such as wild turkeys, it has been determined that an animated decoy more readily attracts live fowl to a target zone than do immovable decoys. Numerous types of animated decoys have been developed over time. Some examples are shown by the following patent disclosures.

Some decoy designs have used and continue to use a cord attached to a moveable portion of the device which the hunter would pull to create motion from that portion of the decoy. Examples of such movements include the vertical or horizontal movement of the head, the "rocking" of the entire decoy to simulate a feeding motion, the horizontal rotation of the entire body and some movement of the tail region of the decoy. Such devices were found to be not too successful because the hunter would often have to be near the decoy to activate the cord and this motion would often alert the wildfowl before they could be properly targeted.

More complex decoys included the use of motors to actuate certain portions of the body. For example, GB 2 412 560, published May 10, 2005 discloses a wildfowl decoy mounted on a vertical shaft that is inserted into the ground. An external motor is used to impart vertical motion to the head region as well as a pivoting motion for the entire body. The problem with this device is that the external motor detracts from a realistic image of the decoy and is susceptible to the elements.

US Patent Publication 2004/0031185, published Feb. 19, 2004, discloses a turkey decoy mounted on frame having wheels to allow movement over the ground. Internal motors provide movements such as vertical head motion, the lifting and spreading of the tail section and rotation of the body about a vertical axis. The motion of the decoy is controlled by a remote RF transmitter. This device is very complex to build and is consequently susceptible to normal wear and tear.

The fanning of the feathers is a desired feature in animated turkey decoys. US Patent Publication 2004/0250461, published Dec. 16, 2004 discloses a turkey tail feather display mounted on a vertical post. The feathers are motivated to fan out by means of a cord pulled by the hunter. Although not part of the invention, it is suggested that a motionless turkey body decoy may be placed in front of the feather display in order to impart an added degree of realism. However, the body of the decoy is not connected to the tail feather section. This device has many of the drawbacks of some of the devices previously described hereinabove.

SUMMARY OF THE INVENTION

The present invention is an animated wildfowl decoy. Specifically, the device is best suited as a turkey decoy because of the unique combination of mechanisms for both fanning the tail feathers and moving the head region. The entire decoy contains two electrically driven servo motors that are powered by an electrical generating source, such as an internally mounted battery. The body of the decoy is mounted on a vertical post that can be pushed into the ground for stabilization.

For the sake of simplicity and ease of manufacture and repair the servo motors are similar. The rear servo motor contains an arm that rotates with the shaft of the motor. The end of the arm remote from the shaft is hooked up to one end of a connecting rod. The other end of the connecting rod is attached to a ferrule that slides along the axis of a guide shaft that is positioned substantially perpendicular to the vertical post. The ferrule is connected to a plurality of rigid tail feather stays. Fabric connects the tail feather stays to each other and can be imprinted to resemble the feathers of a turkey. As the shaft of the servo motor rotates, the remote end of the arm moves in a circular pattern which causes the connecting rod to cycle between pushing and pulling the ferrule along the guide shaft. The tail feather stays are slidably engaged within a tail guide rack so that when the ferrule is pushed toward the tail, the stays are urged to move in a generally upright direction and fan out, or spread apart from each other. As the ferrule is pulled away from the tail section, the stays are pulled through the guide rack causing the tail section to fold together in a substantially horizontal direction.

The second servo motor is located in the neck region of the decoy to generate a substantially vertical movement of the head, simulating a feeding motion of the animal. The design and operation of the motor, including the rotating arm, the connecting rod, the guide shaft and the ferrule is the same as for the tail section, except that as few as one stay need be used to move the head up and down.

BRIEF DESCRIPTION OF THE DRAWINGS

FIG. 5A shows an encapsulated tail section.

FIG. 5B shows the various components of the encapsulated tail section.

DETAILED DESCRIPTION OF THE INVENTION

Figure 1:
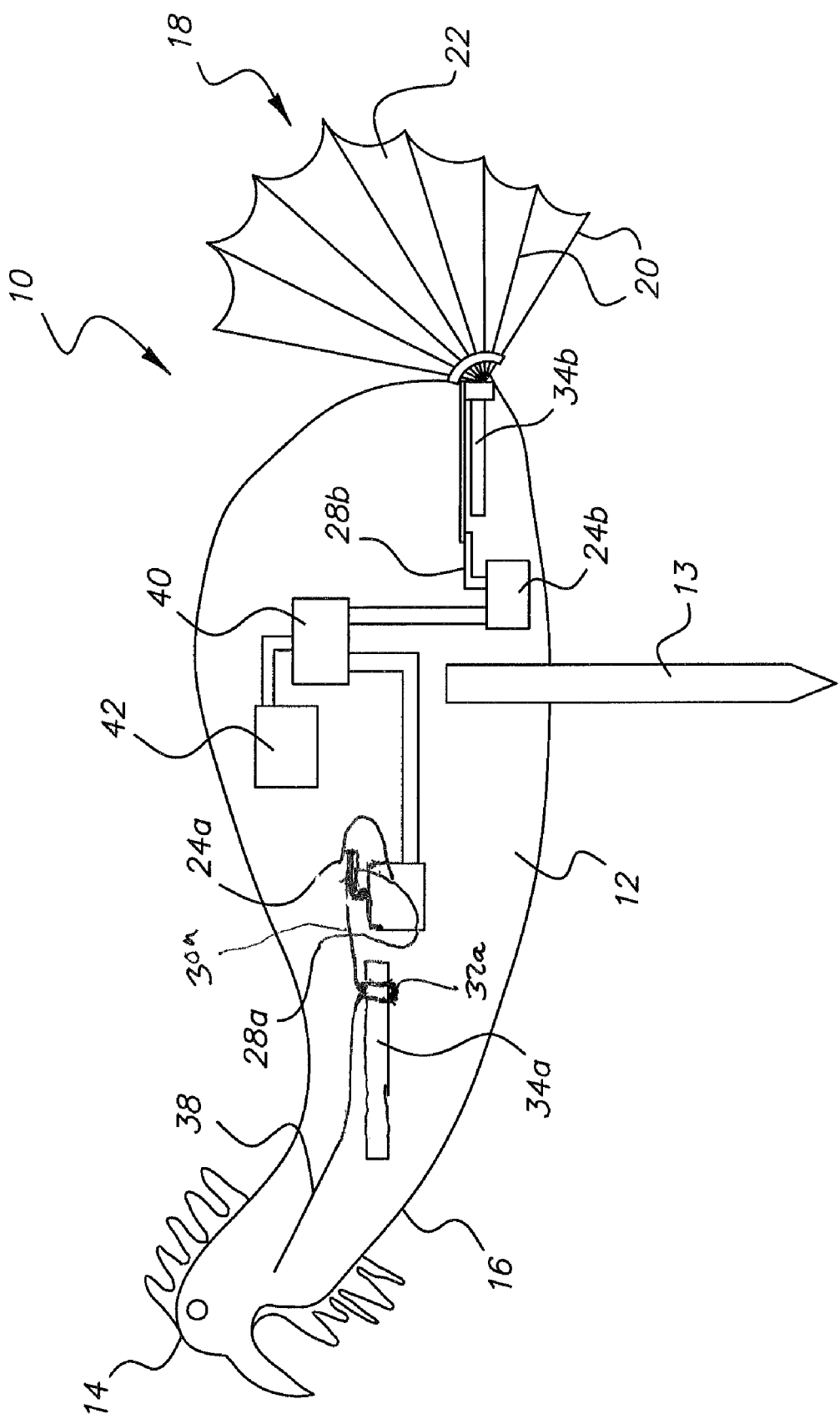
FIG. 1 shows a cut-away view of the animated wildfowl decoy of the present invention having the body of a wild turkey.

Referring to FIG. 1, a cut-away of the animated wildfowl decoy 10 of the present invention is shown. The wildfowl decoy consists of the body of a turkey 12 having a head 14 connected to the body 12 by neck region 16. At the other end of the body 12 is the tail section 18, which may be provided as a separate element, as will be explained later. The body 12 is affixed to a mounting post 13 which can be forcibly inserted into the ground to enable the wildfowl decoy 10 to be securely placed anywhere the hunter desires.

Figure 2A:
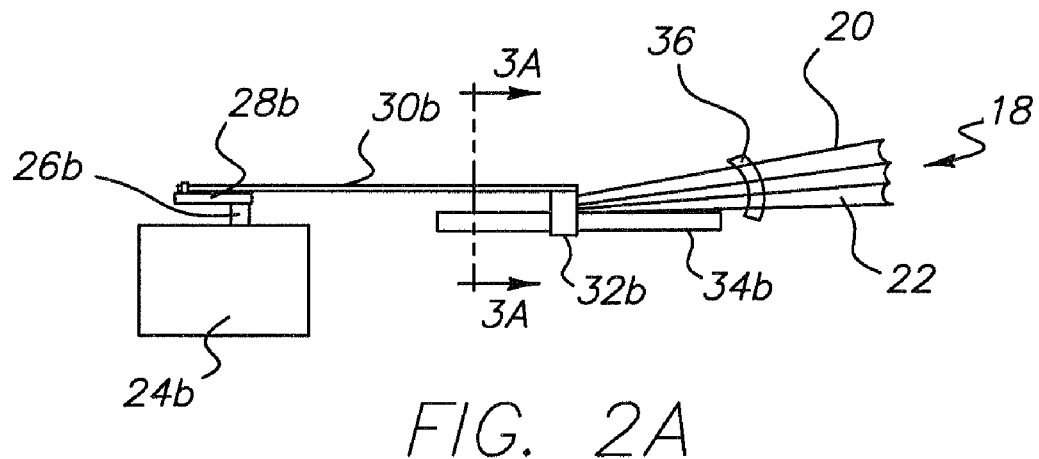
FIG. 2A shows the activation mechanism for fanning the tail feathers in their retracted state.
Figure 2B:
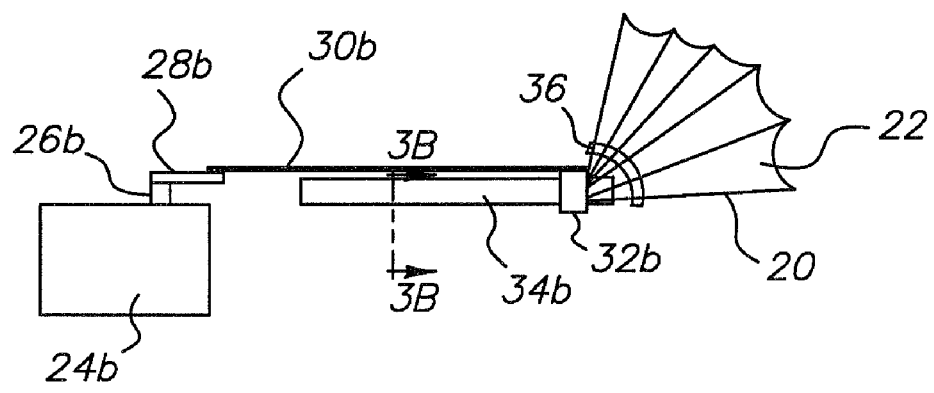
FIG. 2B shows the activation mechanism of FIG. 2A with the tail feathers fully fanned out.

Inside the body 12 are two servo motors, a servo motor in the neck region, designated as 24a, and a servo motor to operate the tail section, designated as 24b. Referring to FIGS. 2A and 2B, the mechanism to operate the tail section 18 is shown. Power source 40 (FIG. 1) provides the necessary energy to run the tail servo motor 24b. When energized, the drive shaft 26b of tail servo motor 24b rotates about its axis. The end of the drive shaft 26b is secured to one end of an arm 28b. The other end of arm 28b is pivotally secured to a first end of connecting rod 30b. The second end of connecting rod 30b is connected to a ferrule 32b, which is slibably mounted around guide shaft 34b. Around the outer perimeter of ferrule 32b are attached one end of a plurality of tail feather stays 20. The tail feather stays are loosely connected to each other by a flexible fabric 22, which may be painted or otherwise printed to resemble the feathers of a live turkey.

Figure 3A:
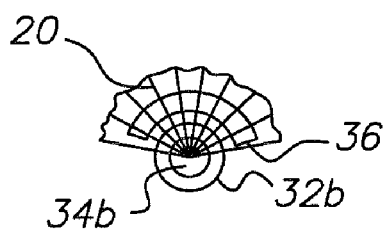
FIG. 3A shows a view of the tail feathers from the perspective of line 3A-3A of FIG. 2A.

When the servo motor 24b is turned on, the shaft 26b rotates so that the end of the arm 28b that is remote from the drive shaft 26b moves in a generally circular pattern. The circular motion of the remote end of the arm 28b causes the connecting rod 30b to move in a linear direction toward or away from the tail section 18. When the connecting rod 30b is at the apex of its travel away from the tail section 18, the ferrule 32b pulls the tail feather stays 20 through a tail guide rail 36 so that the tail section 18 appears to be folded and substantially horizontally positioned with respect to the body 12. Please refer to FIG. 3A which shows this position from the perspective of looking down the axis of guide shaft 34b toward the tail section 18.

Figure 3B:
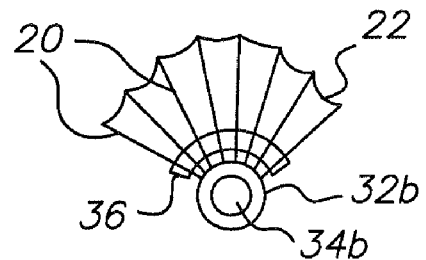
FIG. 3B shows a view of the tail feathers from the perspective of line 3B-3B of FIG. 2B.

As the shaft 26b continues to rotate, it will swing arm 28b so that connecting rod 30b begins to push ferrule 32b toward the tail region 18. As this happens, the tail feather stays 20 are urged by the tail guide rail 36 to separate from each other and move toward a substantially vertical direction, which makes it look like the wildfowl decoy 10 is fanning its tail feathers in imitation of the normal motions of a male turkey (note FIG. 2B). FIG. 3B gives a view of the fully fanned out tail feathers looking down the axis of guide shaft 34b.

Figure 4A:
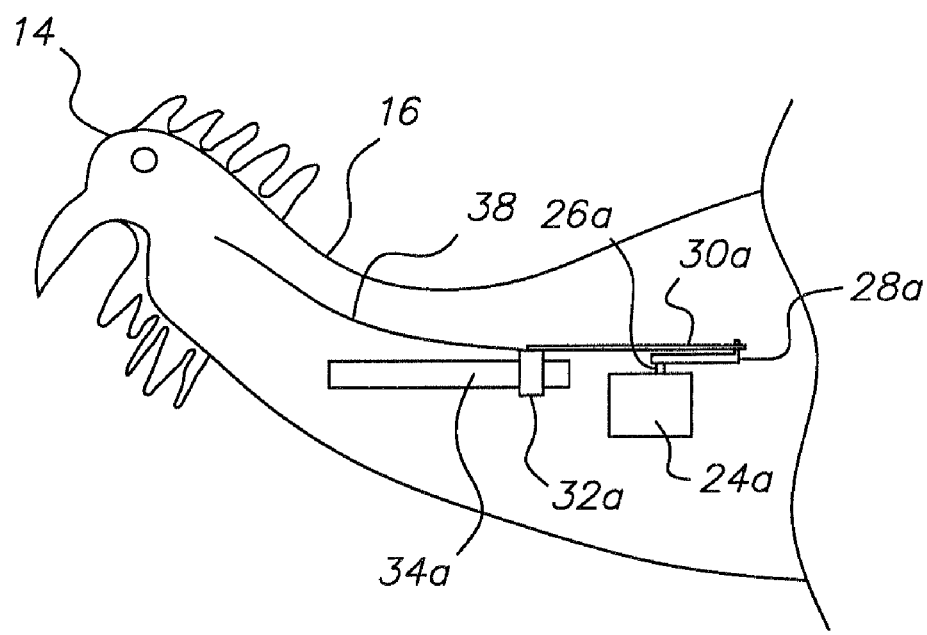
FIG. 4A shows a cut-away view of the head region and the activation mechanism for moving the head vertically with the head in a downward position.
Figure 4B:
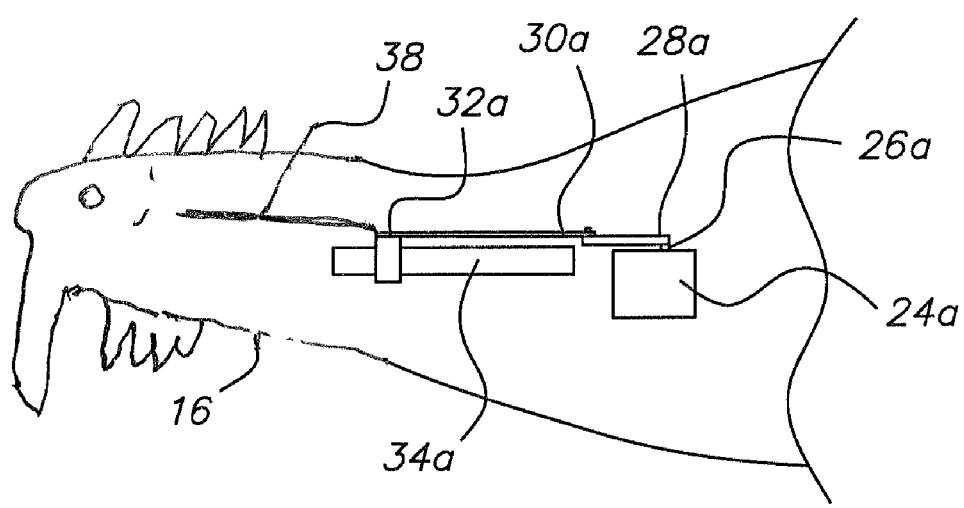
FIG. 4B shows a cut away view of the head region and the activation mechanism for moving the head vertically with the head in an upright position.

The mechanism for providing a reciprocal vertical motion to the head is essentially the same as that which has just been described with respect to the tail region. Referring to FIGS. 4A and 4B, a servo motor 24a has a rotating drive shaft 26a that is connected to one end of an arm 28a. The remote end of arm 28a is pivotally secured to a first end of connecting rod 30a. The second end of connecting rod 30a is secured to ferrule 32a, which is slidably mounted around guide shaft 34a. The outer perimeter of ferrule 32a is pivotally secured to a first end of at least one head control stay 38. The second end of head control stay 38 is securely mounted to the inside surface of the body within either the head 14 or upper neck 16. As the servo motor 24a is energized, the drive shaft 26a causes the remote end of arm 28a to move in a circular pattern. At the apex of the travel of arm 28a away from the head 14, the connecting rod has pulled ferrule 32a to its most rearward position on guide shaft 34a, which, in turn, pulls head control stay 38 so that the head 14 of the wildfowl decoy 10 is at its highest vertical position. As the drive shaft 26a continues to rotate, the arm 28a pushes the connecting rod 30a to urge the ferrule 32a toward its forward most position, which in turn, causes the head 14 to drop, the combined up and down motion imitates the feeding motion of a live turkey.

As noted previously, the animated wildfowl decoy of the invention is energized by an internal power source 40, which may consist of a pack of disposable batteries or a rechargeable battery. The actions of the animated wildfowl decoy 10 are controlled by a remote radio frequency (RF) transmitter (not shown). An internal RF receiver 42 receives inputs from the remote RF transmitter and directs the power source 40 to energize one or both of the servo motors. The RF transmitter may direct the wildfowl decoy 10 to move only its head, only its tail feathers, or, both motions may be ordered by the RF transmitter, as desired by the hunter. The RF receiver may also be programmed so that, in response to specific RF transmitter inputs, a choreographed predetermined sequence of motions may be made.

A unique embodiment of this invention is shown in FIGS. 5A and B. It relates only to the tail feather section of the decoy. The tail feather section, as best shown in FIGS. 2A and B, is partially encapsulated by a hollow container 50. Substantially all but the tail feathers 22 and tail feather stays 20 are encased through a hole in one end of the container 50. A power cord 52 provides the electricity needed to run the servo motor 24b. It connects the servo motor 24b to a battery source 40 (please refer to FIG. 1) via a conventional electrical connector 54. FIG. 5B shows the various individual elements of the encapsulated tail section. An encapsulated tail section has the ability to be adapted to fit most conventional turkey decoys. Of course, those turkey decoys must have an electrical power source that is capable of being adapted to provide electric power to run the tail section servo motor. The electrical fittings may have to be adapted to mate with the power source of the decoy to which the encapsulated tail section is being added. As for installing the encapsulated tail section, it is a relatively simple process, and might simply include making an appropriately sized incision in the posterior region of the decoy, inserting the encapsulated tail section and securing it to the body of the decoy by any one of many conventional means of attachment.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An animated wildfowl decoy comprising:
    a) a body having a head connected to a neck region and a tail section, the tail section having simulated tail feathers,
    b) a first servo motor in proximity to the neck region to provide a reciprocal vertical motion to the head and a second servo motor in proximity to the tail section to provide a reciprocal fanning motion to the simulated tail feathers,
    c) an internal power source to energize the first and second servo motors,
    d) an internal radio frequency receiver to receive inputs from a remote radio frequency transmitter in order to activate the first and second servo motors in response to the inputs,
    wherein the second servo motor consists of a drive shaft secured to a first end of an arm, a second end of the arm pivotally secured to a first end of a connecting rod, a second end of the connecting rod secured to a ferrule slidably mounted around a guide shaft, the simulated tail feathers comprising a plurality of tail feather stays, an outer perimeter of the ferrule pivotally securing a first end of each of the simulated tail feathers thereto by pivotally attaching to one end of respective tail feather stays, each tail feather stay having a shaft, the shaft of each tail feather stay traversing through a tail guide rail, each of the tail feather stays further loosely interconnected to each other by a flexible fabric.

2. The animated wildfowl decoy of claim 1 wherein the body resembles a turkey.

3. The animated wildfowl decoy of claim 1 wherein the radio frequency receiver can be pre-programmed to provide at least one of a choreographed series of motions of the animated wildfowl decoy.

4. The animated wildfowl decoy of claim 3 wherein one of the motions simulates the wildfowl feeding by repeatedly moving the head vertically up and down.

5. The animated wildfowl decoy of claim 3 wherein one of the motions is the repeated fanning of the tail feathers.

* * * * *